US010235904B2

(12) United States Patent
Rios et al.

(10) Patent No.: US 10,235,904 B2
(45) Date of Patent: Mar. 19, 2019

(54) INJECTION TRAINING TOOL EMITTING OMNIDIRECTIONAL LIGHT

(71) Applicant: Truinject Medical Corp., Irvine, CA (US)

(72) Inventors: Gabrielle A. Rios, Irvine, CA (US); Clark B. Foster, Mission Viejo, CA (US)

(73) Assignee: Truinject Corp., Irvine, CA (US)

( * ) Notice: Subject to any disclaimer, the term of this patent is extended or adjusted under 35 U.S.C. 154(b) by 441 days.

(21) Appl. No.: 14/952,809

(22) Filed: Nov. 25, 2015

(65) Prior Publication Data

US 2016/0155363 A1 Jun. 2, 2016

Related U.S. Application Data

(60) Provisional application No. 62/085,935, filed on Dec. 1, 2014.

(51) Int. Cl.
G09B 5/00 (2006.01)
G09B 23/28 (2006.01)

(52) U.S. Cl.
CPC ............ G09B 23/285 (2013.01); G09B 5/00 (2013.01)

(58) Field of Classification Search
CPC .................................. G09B 23/285; G09B 5/00
USPC ........................................................ 434/262
See application file for complete search history.

(56) References Cited

U.S. PATENT DOCUMENTS

| 3,237,340 | A | 3/1966 | Knott |
| 3,941,121 | A | 3/1976 | Olinger et al. |
| 4,142,517 | A | 3/1979 | Contreras Guerrero de Stavropoulos et al. |
| 4,311,138 | A | 1/1982 | Sugarman |
| 4,356,828 | A | 11/1982 | Jamshidi |
| 4,410,020 | A | 10/1983 | Lorenz |
| 4,515,168 | A | 5/1985 | Chester et al. |
| 4,566,438 | A | 1/1986 | Liese et al. |
| 4,836,632 | A | 6/1989 | Bardoorian |
| 4,880,971 | A | 11/1989 | Danisch |
| 5,197,476 | A | 3/1993 | Nowacki et al. |
| 5,198,877 | A | 3/1993 | Schulz |
| 5,241,184 | A | 8/1993 | Menzel |
| 5,249,581 | A | 10/1993 | Horbal et al. |
| 5,295,483 | A | 3/1994 | Nowacki et al. |

(Continued)

FOREIGN PATENT DOCUMENTS

| AU | 2011218649 B2 | 9/2011 |
| AU | 2015255197 A1 | 12/2015 |

(Continued)

OTHER PUBLICATIONS

"B-Smart disposable manometer for measuring peripheral nerve block injection pressures", Bbraun USA, 2016, in 4 pages.

(Continued)

Primary Examiner — Robert P Bullington
(74) Attorney, Agent, or Firm — Knobbe Martens Olson & Bear LLP

(57) ABSTRACT

Systems, methods, and apparatuses for providing substantially omnidirectional light emission from a tip of a needle for use with injection training systems are provided. The substantially omnidirectional light emission improves the angular range of detection of the emitted light. The approach uses principles of fluorescence and/or light diffusion to emit light in a substantially omnidirectional pattern from the needle tip in order to improve the detectability of the emitted light by a light detector.

20 Claims, 5 Drawing Sheets

(56) References Cited

U.S. PATENT DOCUMENTS

| | | |
|---|---|---|
| 5,321,257 A | 6/1994 | Danisch |
| 5,391,081 A | 2/1995 | Lampotang et al. |
| 5,518,407 A | 5/1996 | Greenfield et al. |
| 5,622,170 A | 4/1997 | Schulz |
| 5,651,783 A | 7/1997 | Reynard |
| 5,727,948 A | 3/1998 | Jordan |
| 5,817,105 A | 10/1998 | Van Der Brug |
| 5,828,770 A | 10/1998 | Leis et al. |
| 5,890,908 A | 4/1999 | Lampotang et al. |
| 5,899,692 A | 5/1999 | Davis et al. |
| 5,923,417 A | 7/1999 | Leis |
| 5,954,648 A | 9/1999 | Van Der Brug |
| 5,954,701 A | 9/1999 | Matalon |
| 6,024,576 A | 2/2000 | Bevirt et al. |
| 6,061,644 A | 5/2000 | Leis |
| 6,064,749 A | 5/2000 | Hirota et al. |
| 6,127,672 A | 10/2000 | Danisch |
| 6,217,558 B1 | 4/2001 | Zadini et al. |
| 6,288,785 B1 | 9/2001 | Frantz et al. |
| 6,353,226 B1 | 3/2002 | Khalil et al. |
| 6,385,482 B1 | 5/2002 | Boksberger et al. |
| 6,485,308 B1 | 11/2002 | Goldstein |
| 6,553,326 B1 | 4/2003 | Kirsch et al. |
| 6,564,087 B1 | 5/2003 | Pitris et al. |
| 6,575,757 B1 | 6/2003 | Leight et al. |
| 6,625,563 B2 | 9/2003 | Kirsch et al. |
| 6,702,790 B1 | 3/2004 | Ross et al. |
| 6,769,286 B2 | 8/2004 | Biermann et al. |
| 6,774,624 B2 | 8/2004 | Anderson et al. |
| 6,836,745 B2 | 12/2004 | Seiler et al. |
| 7,015,859 B2 | 3/2006 | Anderson |
| 7,137,712 B2 | 11/2006 | Brunner et al. |
| 7,158,754 B2 | 1/2007 | Anderson |
| 7,194,296 B2 | 3/2007 | Frantz et al. |
| 7,204,796 B1 | 4/2007 | Seiler |
| 7,247,149 B2 | 7/2007 | Beyerlein |
| 7,383,728 B2 | 6/2008 | Noble et al. |
| 7,500,853 B2 | 3/2009 | Bevirt et al. |
| 7,553,159 B1 | 6/2009 | Arnal et al. |
| 7,594,815 B2 | 9/2009 | Toly |
| 7,665,995 B2 | 2/2010 | Toly |
| 7,725,279 B2 | 5/2010 | Luinge et al. |
| 7,761,139 B2 | 7/2010 | Tearney et al. |
| 7,783,441 B2 | 8/2010 | Nieminen et al. |
| 7,857,626 B2 | 12/2010 | Toly |
| 7,912,662 B2 | 3/2011 | Zuhars et al. |
| 7,945,311 B2 | 5/2011 | McCloy et al. |
| 8,007,281 B2 | 8/2011 | Toly |
| 8,040,127 B2 | 10/2011 | Jensen |
| 8,072,606 B2 | 12/2011 | Chau et al. |
| 8,131,342 B2 | 3/2012 | Anderson |
| 8,165,844 B2 | 4/2012 | Luinge et al. |
| 8,203,487 B2 | 6/2012 | Hol et al. |
| 8,208,716 B2 | 6/2012 | Choi et al. |
| 8,226,610 B2 | 7/2012 | Edwards et al. |
| 8,250,921 B2 | 8/2012 | Nasiri et al. |
| 8,257,250 B2 | 9/2012 | Tenger et al. |
| 8,277,411 B2 | 10/2012 | Gellman |
| 8,319,182 B1 | 11/2012 | Brady et al. |
| 8,342,853 B2 | 1/2013 | Cohen |
| 8,351,773 B2 | 1/2013 | Nasiri et al. |
| 8,382,485 B2 | 2/2013 | Bardsley |
| 8,403,888 B2 | 3/2013 | Gaudet |
| 8,408,918 B2 | 4/2013 | Hu et al. |
| 8,409,140 B2 | 4/2013 | Ejlersen et al. |
| 8,437,833 B2 | 5/2013 | Silverstein |
| 8,442,619 B2 | 5/2013 | Li et al. |
| 8,450,997 B2 | 5/2013 | Silverman |
| 8,467,855 B2 | 6/2013 | Yasui |
| 8,525,990 B2 | 9/2013 | Wilcken |
| 8,535,062 B2 | 9/2013 | Nguyen |
| 8,556,635 B2 | 10/2013 | Toly |
| 8,632,498 B2 | 1/2014 | Rimsa et al. |
| 8,655,622 B2 | 2/2014 | Yen et al. |
| 8,689,801 B2 | 4/2014 | Ritchey et al. |
| 8,764,449 B2 | 7/2014 | Rios et al. |
| 8,818,751 B2 | 8/2014 | Van Acht et al. |
| 8,945,147 B2 | 2/2015 | Ritchey et al. |
| 8,961,189 B2 | 2/2015 | Rios et al. |
| 8,994,366 B2 | 3/2015 | Ashe |
| 9,017,080 B1 | 4/2015 | Placik |
| 9,024,624 B2 | 5/2015 | Brunner |
| 9,031,314 B2 | 5/2015 | Clausen et al. |
| 9,251,721 B2 | 2/2016 | Lampotang et al. |
| 9,439,653 B2 | 9/2016 | Avneri et al. |
| 9,443,446 B2 | 9/2016 | Rios et al. |
| 9,456,766 B2 | 10/2016 | Cox et al. |
| 9,460,638 B2 | 10/2016 | Baker et al. |
| 9,486,162 B2 | 11/2016 | Zhuang et al. |
| 9,626,805 B2 | 4/2017 | Lampotang et al. |
| 9,792,836 B2 | 10/2017 | Rios et al. |
| 9,922,578 B2 | 3/2018 | Foster et al. |
| 2002/0168618 A1 | 11/2002 | Anderson et al. |
| 2003/0031993 A1 | 2/2003 | Pugh |
| 2003/0055380 A1 | 3/2003 | Flaherty |
| 2003/0108853 A1 | 6/2003 | Chosack et al. |
| 2003/0114842 A1 | 6/2003 | DiStefano |
| 2004/0009459 A1 | 1/2004 | Anderson et al. |
| 2004/0092878 A1 | 5/2004 | Flaherty |
| 2004/0118225 A1 | 6/2004 | Wright |
| 2004/0175684 A1 | 9/2004 | Kaasa et al. |
| 2005/0057243 A1 | 3/2005 | Johnson et al. |
| 2005/0084833 A1 | 4/2005 | Lacey et al. |
| 2005/0181342 A1 | 8/2005 | Toly |
| 2006/0084050 A1 | 4/2006 | Haluck |
| 2006/0194180 A1 | 8/2006 | Bevirt et al. |
| 2006/0264745 A1 | 11/2006 | Da Silva |
| 2007/0003917 A1 | 1/2007 | Kitching et al. |
| 2007/0197954 A1 | 8/2007 | Keenan |
| 2007/0238981 A1 | 10/2007 | Zhu |
| 2008/0097378 A1 | 4/2008 | Zuckerman |
| 2008/0107305 A1 | 5/2008 | Vanderkooy et al. |
| 2008/0138781 A1 | 6/2008 | Pellegrin et al. |
| 2008/0176198 A1 | 7/2008 | Ansari et al. |
| 2009/0046140 A1 | 2/2009 | Lashmet |
| 2009/0061404 A1 | 3/2009 | Toly |
| 2009/0081619 A1 | 3/2009 | Miasnik |
| 2009/0081627 A1 | 3/2009 | Ambrozio |
| 2009/0123896 A1 | 5/2009 | Hu et al. |
| 2009/0142741 A1 | 6/2009 | Ault et al. |
| 2009/0208915 A1 | 8/2009 | Pugh |
| 2009/0263775 A1 | 10/2009 | Ullrich |
| 2009/0265671 A1 | 10/2009 | Sachs et al. |
| 2009/0278791 A1 | 11/2009 | Slycke et al. |
| 2009/0305213 A1 | 12/2009 | Burgkart et al. |
| 2009/0326556 A1 | 12/2009 | Diolaiti |
| 2010/0030111 A1 | 2/2010 | Perriere |
| 2010/0071467 A1 | 3/2010 | Nasiri et al. |
| 2010/0099066 A1 | 4/2010 | Mire et al. |
| 2010/0120006 A1 | 5/2010 | Bell |
| 2010/0167249 A1 | 7/2010 | Ryan |
| 2010/0167254 A1 | 7/2010 | Nguyen |
| 2010/0179428 A1 | 7/2010 | Pederson et al. |
| 2010/0273135 A1 | 10/2010 | Cohen |
| 2011/0027767 A1 | 2/2011 | Divinagracia |
| 2011/0046915 A1 | 2/2011 | Hol et al. |
| 2011/0071419 A1 | 3/2011 | Liu et al. |
| 2011/0202012 A1 | 8/2011 | Bartlett |
| 2011/0207102 A1 | 8/2011 | Trotta et al. |
| 2011/0236866 A1 | 9/2011 | Psaltis et al. |
| 2011/0257596 A1 | 10/2011 | Gaudet |
| 2011/0269109 A2 | 11/2011 | Miyazaki |
| 2011/0294103 A1 | 12/2011 | Segal et al. |
| 2011/0301500 A1 | 12/2011 | Maguire et al. |
| 2012/0015336 A1 | 1/2012 | Mach |
| 2012/0026307 A1 | 2/2012 | Price |
| 2012/0034587 A1 | 2/2012 | Toly |
| 2012/0130269 A1 | 5/2012 | Rea |
| 2012/0148994 A1 | 6/2012 | Hori et al. |
| 2012/0171652 A1 | 7/2012 | Sparks et al. |
| 2012/0214144 A1 | 8/2012 | Trotta et al. |
| 2012/0219937 A1 | 8/2012 | Hughes |
| 2012/0238875 A1 | 9/2012 | Savitsky et al. |
| 2012/0251987 A1 | 10/2012 | Huang et al. |

(56) References Cited

U.S. PATENT DOCUMENTS

| | | |
|---|---|---|
| 2012/0280988 A1 | 11/2012 | Lampotang et al. |
| 2012/0282583 A1 | 11/2012 | Thaler et al. |
| 2012/0301858 A1 | 11/2012 | Park et al. |
| 2012/0323520 A1 | 12/2012 | Keal |
| 2013/0018494 A1 | 1/2013 | Amini |
| 2013/0046489 A1 | 2/2013 | Keal |
| 2013/0100256 A1 | 4/2013 | Kirk et al. |
| 2013/0131503 A1 | 5/2013 | Schneider et al. |
| 2013/0179110 A1 | 7/2013 | Lee |
| 2013/0189658 A1 | 7/2013 | Peters et al. |
| 2013/0197845 A1 | 8/2013 | Keal |
| 2013/0198625 A1 | 8/2013 | Anderson |
| 2013/0203032 A1 | 8/2013 | Bardsley |
| 2013/0236872 A1 | 9/2013 | Laurusonis et al. |
| 2013/0267838 A1 | 10/2013 | Fronk et al. |
| 2013/0296691 A1 | 11/2013 | Ashe |
| 2013/0323700 A1 | 12/2013 | Samosky |
| 2014/0102167 A1 | 4/2014 | MacNeil et al. |
| 2014/0120505 A1 | 5/2014 | Rios et al. |
| 2014/0121636 A1 | 5/2014 | Boyden |
| 2014/0162232 A1 | 6/2014 | Yang et al. |
| 2014/0212864 A1 | 7/2014 | Rios et al. |
| 2014/0240314 A1 | 8/2014 | Fukazawa et al. |
| 2014/0244209 A1 | 8/2014 | Lee et al. |
| 2014/0260704 A1 | 9/2014 | Lloyd et al. |
| 2014/0278183 A1 | 9/2014 | Zheng et al. |
| 2014/0278205 A1 | 9/2014 | Bhat et al. |
| 2014/0278215 A1 | 9/2014 | Keal et al. |
| 2015/0079545 A1 | 3/2015 | Kurtz |
| 2015/0182706 A1 | 7/2015 | Wurmbauer et al. |
| 2015/0206456 A1 | 7/2015 | Foster et al. |
| 2015/0262512 A1 | 9/2015 | Rios et al. |
| 2015/0352294 A1 | 12/2015 | O'Mahoney et al. |
| 2015/0379899 A1 | 12/2015 | Baker et al. |
| 2015/0379900 A1 | 12/2015 | Samosky et al. |
| 2016/0000411 A1 | 1/2016 | Raju et al. |
| 2016/0001016 A1 | 1/2016 | Poulsen et al. |
| 2016/0155363 A1 | 6/2016 | Rios et al. |
| 2016/0193428 A1 | 7/2016 | Perthu |
| 2016/0213856 A1 | 7/2016 | Despa et al. |
| 2016/0293058 A1 | 10/2016 | Gaillot et al. |
| 2017/0136185 A1 | 5/2017 | Rios et al. |
| 2017/0178540 A1 | 6/2017 | Rios et al. |
| 2017/0186339 A1 | 6/2017 | Rios et al. |
| 2017/0245943 A1 | 8/2017 | Foster et al. |
| 2017/0252108 A1 | 9/2017 | Rios et al. |
| 2017/0254636 A1 | 9/2017 | Foster et al. |
| 2018/0012516 A1 | 1/2018 | Rios et al. |
| 2018/0197441 A1 | 7/2018 | Rios et al. |
| 2018/0211562 A1 | 7/2018 | Rios et al. |
| 2018/0240365 A1 | 8/2018 | Foster et al. |

FOREIGN PATENT DOCUMENTS

| | | |
|---|---|---|
| CA | 2865236 A1 | 9/2013 |
| CN | 2751386 Y | 1/2006 |
| CN | 201213049 Y | 3/2009 |
| CN | 102708745 A | 10/2012 |
| CN | 104703641 A | 6/2015 |
| CN | 105118350 A | 12/2015 |
| CN | 205541594 U | 8/2016 |
| CN | 106710413 A | 5/2017 |
| CN | 107067856 A | 8/2017 |
| DE | 202005021286 U1 | 9/2007 |
| EP | 0316763 A1 | 5/1989 |
| EP | 1504713 A1 | 2/2005 |
| EP | 1723977 A1 | 11/2006 |
| EP | 1884211 A2 | 2/2008 |
| EP | 2425416 B1 | 3/2015 |
| EP | 2538398 B1 | 8/2015 |
| EP | 2756857 B1 | 5/2016 |
| GB | 2288686 B | 7/1997 |
| GB | 2309644 A | 8/1997 |
| GB | 2508510 | 6/2014 |
| IN | 201202900 P1 | 11/2013 |
| JP | 2013-037088 A | 2/2013 |
| JP | 52-21420 | 6/2013 |
| JP | 2013-250453 A | 12/2013 |
| JP | 2014-153482 A | 8/2014 |
| KR | 2012009379 A | 2/2012 |
| KR | 20140047943 A | 4/2014 |
| TW | 201207785 A | 2/2012 |
| WO | WO 00/53115 | 9/2000 |
| WO | WO 02/083003 A1 | 10/2002 |
| WO | WO 2005/083653 | 9/2005 |
| WO | WO 2007/109540 A2 | 9/2007 |
| WO | WO 2008/005315 A2 | 1/2008 |
| WO | WO 2008/122006 A1 | 10/2008 |
| WO | WO 2009/023247 A1 | 2/2009 |
| WO | WO 2009/094646 A2 | 7/2009 |
| WO | WO 2009/141769 | 11/2009 |
| WO | WO 2011/043645 | 4/2011 |
| WO | WO 2011/127379 | 10/2011 |
| WO | WO 2011/127379 A2 | 10/2011 |
| WO | WO 2011/136778 | 11/2011 |
| WO | WO 2012/075166 | 6/2012 |
| WO | WO 2012/088471 A1 | 6/2012 |
| WO | WO 2012/101286 | 8/2012 |
| WO | WO 2012/106706 | 8/2012 |
| WO | WO 2012/155056 | 11/2012 |
| WO | WO 2013/025639 | 2/2013 |
| WO | WO 2013/064804 A1 | 5/2013 |
| WO | WO 2014/070799 | 5/2014 |
| WO | WO 2014/100658 | 6/2014 |
| WO | WO 2015/109251 | 7/2015 |
| WO | WO 2015/110327 A1 | 7/2015 |
| WO | WO 2015/136564 | 9/2015 |
| WO | WO 2015/138608 | 9/2015 |
| WO | WO 2015/171778 | 11/2015 |
| WO | WO 2016/089706 | 6/2016 |
| WO | WO 2016/123144 A2 | 8/2016 |
| WO | WO 2016/162298 | 10/2016 |
| WO | WO 2016/191127 | 12/2016 |
| WO | WO 2017/048929 A1 | 3/2017 |
| WO | WO 2017/048931 A1 | 3/2017 |
| WO | WO 2017/050781 A1 | 3/2017 |
| WO | WO 2017/060017 A1 | 4/2017 |
| WO | WO 2017/070391 | 4/2017 |
| WO | WO 2017/151441 | 9/2017 |
| WO | WO 2017/151716 | 9/2017 |
| WO | WO 2017/151963 | 9/2017 |
| WO | WO 2017/153077 | 9/2017 |
| WO | WO 2018/136901 | 7/2018 |

OTHER PUBLICATIONS

Bergamini et al., "Estimating Orientation Using Magnetic and Inertial Sensors and Different Sensor Fusion Approaches: Accuracy Assessment in Manual and Locomotion Tasks", Oct. 2014, 18625-18649.
Correa et al., "Virtual Reality Simulator for Dental Anesthesia Training in the Inferior Alveolar Nerve Block," Journal of Applied Oral Science, vol. 25, No. 4, Jul./Aug. 2017, pp. 357-366.
"EPGL Medical Invents Smart Epidural Needle, Nerve Ablation and Trigger Point Treatment Devices: New Smart Medical Devices Will Give Physicians Advanced Situational Awareness During Critical Procedures," EPGL Medical, dated Aug. 12, 2013, in 3 pages. Retrieved from http://www.prnewswire.com/news-releases/epgl-medical-invents-smart-epidural-needle-nerve-ablation-and-trigger-point-treatment-devices-219344621.html#.
"The EpiAccess System: Access with Confidence", EpiEP Epicardial Solutions, dated 2015, in 2 pages.
Garg et al., "Radial Artery cannulation-Prevention of pain and Techniques of cannulation: review of literature," The Internet Journal of Anesthesiology, vol. 19, No. 1, 2008, in 6 pages.
Helen, L., et al. "Investigation of tissue bioimpedance using a macro-needle with a potential application in determination of needle-to-nerve proximity", Proceedings of the 8th International Conference on Sensing Technology, Sep. 2-4, 2014, pp. 376-380.
International Search Report and Written Opinion for Appl. No. PCT/US2015/062798, dated Mar. 14, 2016, 12 pages.

(56) References Cited

OTHER PUBLICATIONS

Jafarzadeh et al., "Design and construction of an automatic syringe injection pump," Pacific Science Review A: Natural Science and Engineering 18, 2016, in 6 pages.
Kalvoy, H., et al., "Detection of intraneural needle-placement with multiple frequency bioimpedance monitoring: a novel method", Journal of Clinical Monitoring and Computing, Apr. 2016, 30(2):185-192.
Kettenbach et al., "A robotic needle-positioning and guidance system for CT-guided puncture: Ex vivo results," Minimally Invasive Therapy and Allied Technologies, vol. 23, 2014, in 8 pages.
Ladjal, et al., "Interactive Cell Injection Simulation Based on 3D Biomechanical Tensegrity Model," 2008 IEEE/RSJ International Conference on Intelligent Robots and Systems, in 9 pages.
Lee et al., "An Intravenous Injection Simulator Using Augmented Reality for Veterinary Education and its Evaluation," Proceedings of the 11th ACM SIGGRAPH International Conference on Virtual-Reality Continuum and its Applications in Industry, Dec. 2-4, 2012, in 4 pages.
MPU-9150, Product Specification, Revision 4.3, 50 pp., Sep. 18, 2013, http//www.invensense.com.
PST Iris Tracker, Plug and Play, 3D optical motion tracking specifications, 1 p., Dec. 4, 2014, www.pstech.com.
Truinject Corp., "Smart Injection Platform," http://truinject.com/technology/, in 3 pages.
Afzal, et al., "Use of Earth's Magnetic Field for Mitigating Gyroscope Errors Regardless of Magnetic Perturbation," *Sensors* 2011, 11, 11390-11414; doi:10.3390/s111211390, 25 pp. published Nov. 30, 2011.
Andraos et al., "Sensing your Orientation" Address 2007, 7 pp.
Arms, S.W., "A Vision for Future Wireless Sensing Systems," 44 pp., 2003.
Bao, et al., "A Novel Map-Based Dead-Reckoning Algorithm for Indoor Localization", *J. Sens. Actuator Netw*, 2014, 3, 44-63; doi:10.3390/jsan3010044, 20 pp., Jan. 3, 2014.
Benbasat et al., "An Inertial Measurement Framework for Gesture Recognition and Applications," I. Wachsmuth and T. Sowa (Eds.): GW 2001, Springer-Verlag Berlin Heidelberg, 12 pp., 2002.
Brunet et al., "Uncalibrated Stereo Vision," A CS 766 Project, University of Wisconsin—Madison, 6 pp, Fall 2004, http://pages.cs.wisc.edu/~chaol/cs766/.
Brunet et al., "Uncalibrated Stereo Vision," A CS 766 Project, University of Wisconsin—Madison, 13 pp, Fall 2004, http://pages.cs.wisc.edu/~chaol/cs766/.
Desjardins, et al. "Epidural needle with embedded optical fibers for spectroscopic differentiation of tissue: ex vivo feasibility study", Biomedical Optics Express, vol. 2(6): pp. 1-10. Jun. 2011.
Esteve, Eric, "Why do you need 9D Sensor Fusion to support 3D orientation?", 5 pp., Aug. 23, 2014, https://www.semiwiki.com/forum/content/3794-why-do-you-need-9d-sensor-fusion-support-3d-orientation.html.
Grenet et al., "spaceCoder: a Nanometric 3D Position Sensing Device," CSEM Scientific & Technical Report, 1 page, 2011.
Inition. Virtual Botox: Haptic App Simulated Injecting the Real Thing. Retrieved from http://inition.co.uk/case-study/virtual-botox-haptic-app-simulates-injecting-real-thing.
Madgwick, Sebastian O.H., "An efficient orientation filter for intertial and inertial/magnetic sensor arrays," 32 pp., Apr. 30, 2010.
Microsoft, "Integrating Motion and Orientation Sensors," 85 pp., Jun. 10, 2013.
Miller, Nathan L., Low-Power, Miniature Inertial Navigation System with Embedded GPS and Extended Kalman Filter, Microstrain, Inc., 12 pp., 2012.
MPU-9150 9-Axis Evaluation Board User Guide, Revision 1.0, 15 pp., May 11, 2011, http//www.invensense.com.
MPU-9150, Register Map and Descriptions, Revision 4.2, 52 pp., Sep. 18, 2013, http//www.invensense.com.
PCT International Search Report and Written Opinion of the International Searching Authority, dated Apr. 29, 2015, issued in International Application No. PCT/US2015/011845, in the Application of Truinject Medical Corp.
PST Iris Tracker, Instruction Manual, 3D optical motion tracking specifications, 42 pp., Jul. 27, 2012, www.pstech.com.
Search and Examination Report for Appl. No. GB1319193.7 in 6 pages dated Mar. 28, 2014.
Search and Examination Report, dated Feb. 23, 2015, by the UK Intellectual Property Office, in the matter of Application No. GB1414892.8 of TruInject Medical Corporation, 6 pp.
Search Report and Written Opinion for Appl. No. PCT/US2013/067352 dated Mar. 31, 2014 in 10 pages.
Struik, Pieter, "Ultra Low-Power 9D Fusion Implementation: A Case Study," Synopsis, Inc., 7 pp., Jun. 2014.
Sutherland, et al. "An Augmented Reality Haptic Training Simulator for Spinal Needle Procedures," IEEE, 2011.
Varesano, Fabio, "FreeIMU: An Open Hardware Framework for Orientation and Motion Sensing," Dipartimento di Informatica, Univ. Torino, http://www.di.unito.it/~varesano, Mar. 20, 2013, 10 pp.
Varesano, Fabio, "Prototyping Orientation and Motion Sensing Objects with Open Hardware," Dipartimento di Informatica, Univ. Torino, http://www.di.unito.it/~varesano, Feb. 10 2013, 4 pp.
"A beginner's guide to accelerometers," Dimension Engineering LLC, accessed Jul. 11, 2018, in 2 pages, https://www.dimensionengineering.com/info/accelerometers.
"Accelerometer: Introduction to Acceleration Measurement," Omega Engineering, Sep. 17, 2015, 3 pages, https://www.omega.com/prodinfo/accelerometers.html.
Poyade et al., "Development of a Haptic Training Simulation for the Administration of Dental Anesthesia Based Upon Accurate Anatomical Data," Conference and Exhibition of the European Association of Virtual and Augmented Reality, 2014, in 5 pages.
Quio, "Smartinjector," available at https://web.archive.org/web/20161017192142/http://www.quio.com/smartinjector, Applicant believes to be available as early as Oct. 17, 2016, in 3 pages.
State Electronics, "Sensofoil Membrane Potentiometer," Product Information and Technical Specifications, in 6 pages.

INJECTION TRAINING TOOL EMITTING OMNIDIRECTIONAL LIGHT

INCORPORATION BY REFERENCE TO ANY PRIORITY APPLICATIONS

This application claims benefit of priority under 35 U.S.C. § 119(e) to U.S. Provisional Patent Application No. 62/085,935 filed on Dec. 1, 2014 entitled FLUORESCENCE-BASED NEEDLE POSITION DETECTION which is incorporated by reference herein in its entirety. Any and all applications for which a foreign or domestic priority claim is identified in the Application Data Sheet as filed with the present application are hereby incorporated by reference under 37 CFR 1.57.

BACKGROUND

A variety of medical injection procedures are often performed in prophylactic, curative, therapeutic, or cosmetic treatments. Injections may be administered in various locations on the body, such as under the conjunctiva, into arteries, bone marrow, the spine, the sternum, the pleural space of the chest region, the peritoneal cavity, joint spaces, and internal organs. Injections can also be helpful in administering medication directly into anatomic locations that are generating pain. These injections may be administered intravenously (through the vein), intramuscularly (into the muscle), intradermally (beneath the skin), subcutaneously (into the fatty layer of skin), or intraperitoneally (into the body cavity). Injections can be performed on humans as well as on animals. The methods of administering injections typically vary for different procedures and may depend on the substance being injected, needle size, or area of injection.

Injections are not limited to treating medical conditions, but may be expanded to treating aesthetic imperfections or restorative cosmetic procedures. Many of these procedures are performed through injections of various products into different parts of the body. The aesthetics and therapeutic industry comprises two main categories of injectable products: neuromodulators and dermal fillers. The neuromodulator industry commonly uses nerve-inhibiting products such as Botox®, Dysport®, and Xeomin®. The dermal filler industry uses products administered by providers to patients for both cosmetic and therapeutic reasons, such as, for example, Juvederm®, Restylane®, Belotero®, Sculptra®, Artefill®, and others. These providers or injectors may include plastic surgeons, facial plastic surgeons, oculoplastic surgeons, dermatologists, nurse practitioners, dentists and nurses.

A problem in the administration of injections is that there is no official certification or training process. Anyone with a minimal medically-related license may inject a patient. These "injectors" may include primary care physicians, dentists, veterinarians, nurse practitioners, nurses, physician's assistants, or aesthetic spa physicians. However, the qualifications and training requirements for injectors vary by country, state, and county. For example, in most states in the United States, the only requirement to be permitted to inject patients with neuromodulators and/or fillers is to have a nursing degree or medical degree. Accordingly, there is a lack of uniformity and expertise in administering such injections. The drawbacks with this lack of uniformity in training and expertise are widespread throughout the medical industry. Doctors and practitioners often are not well-trained in administering injections of diagnostic, therapeutic, and cosmetic chemical substances. This lack of training has led to instances of chronic pain, headaches, bruising, swelling, or bleeding in patients.

Current injection training options are classroom-based, with hands-on training performed on live models. The availability of models is limited. Moreover, even when available, live models are limited in the number and types of injections they may receive. The need for live models is restrictive because injectors are unable to be exposed to a wide and diverse range of situations and anatomies in which to practice. For example, it may be difficult to find live models with different skin tones or densities. This makes the training process less effective because patients have diverse anatomical features as well as varying prophylactic, curative, therapeutic, or cosmetic needs. Live models are also restrictive because injectors are unable to practice injection methods on the internal organs of a live model due to safety and health considerations.

As a result of these limited training scenarios, individuals seeking treatments involving injections have a much higher risk of being treated by an inexperienced injector. This may result in low patient satisfaction with the results, or in failed procedures. In many instances, patients have experienced lumpiness from incorrect dermal filler injections. Some failed procedures may result in irreversible problems and permanent damage to a patient's body. For example, patients have experienced vision loss, direct injury to the globe of the eye, and brain infarctions where injectors have incorrectly performed dermal filler procedures. Additional examples of side effects include inflammatory granuloma, skin necrosis, endophthalmitis, injectable-related vascular compromise, cellulitis, biofilm formation, subcutaneous nodules, fibrotic nodules, and other infections.

There is currently no standard to train, educate, and certify providers on the proper and accurate process of various injection techniques. Patients seeking injections also have few resources for determining the qualifications or experience of a care practitioner.

SUMMARY

The present disclosure generally relates to systems, methods, and apparatuses for training and certification for prophylactic, curative, therapeutic, acupuncture, or cosmetic injection. Aspects of this technology are described in U.S. Pat. No. 8,764,449, entitled SYSTEM FOR COSMETIC AND THERAPEUTIC TRAINING; U.S. Pat. No. 8,961,189, entitled SYSTEM FOR COSMETIC AND THERAPEUTIC TRAINING; and U.S. patent application Ser. No. 14/598,614, entitled INJECTION SITE TRAINING SYSTEM, each of which is assigned to the assignee of the present application and incorporated by reference herein in its entirety.

In particular, the present application discloses injection training systems, methods, and apparatuses for radiating or reflecting light energy from a tip of an injection testing tool, such as syringe needle, to facilitate detection of the needle's position in an artificial injection apparatus (for example, an artificial face). The systems, methods, and/or apparatuses may be used for training caregivers on performing injections where accurate positioning is important, such as in facial/Botox injections and/or spinal injections, to name a few.

According to an embodiment of the present disclosure, an injection apparatus (for example, which is used with an artificial injection site, such as, for example, an artificial face) is penetrated by a testing tool, such as a needle mounted to a syringe. The position of the needle tip in the artificial injection site is an important piece of information to determine the skill level of the trainee. One way to track the needle tip position relies on a sensor interior to the artificial face configured to detect through a clear interior space of the artificial face emitted or reflected light from the needle tip as it penetrates the artificial face.

In one aspect of the present disclosure, a testing tool system comprises a needle having a central lumen, a distal end, a proximal end, and a tip at the distal end of the needle. The testing tool system includes a barrel cooperating with the proximal end of the needle and a light source, configured to emit light, positioned in the barrel. The system also includes an optical fiber positioned inside the central lumen of the needle and configured to receive the emitted light from the light source and to transmit the emitted light through the needle from the proximal end to the distal end so that the light is emitted from the needle tip, which is configured to radiate the emitted light. According to certain embodiments, the needle tip is configured to radiate the emitted light uniformly. In some embodiments, the needle tip comprises a fluorescent material configured to radiate the emitted light. The fluorescent material comprises one of a liquid material, a solid material, and a gaseous material, and in some embodiments, the fluorescent material comprises a combination of at least two of a liquid material, a solid material, and a gaseous material. The emitted light may be one or more of visible light, non-visible light, ultraviolet light, polarized light, infrared light, and fluorescent light. In an embodiment, the testing tool comprises a transparent barrier positioned between the optical fiber and the needle tip, where the transparent barrier is filled or coated with a fluorescent material.

In another aspect of the present disclosure, a system for training clinicians to provide injections is provided, the system comprising a testing tool having a needle tip configured to absorb light and to emit light. The system also includes an injection apparatus having an internal portion, where the injection apparatus is configured to receive a simulated injection by the testing tool. A light emitter is also included in the system. The light emitter is positioned within the internal portion of the injection apparatus, and is configured to illuminate the needle tip of the testing tool in response to the injection apparatus receiving the simulated injection by the testing tool. The system also comprises a light detector, positioned in the internal portion of the injection apparatus. The light detector is configured to detect a light emitted from the illuminated needle tip. In some embodiments, the light emitter emits a first light having a first wavelength, and the illuminated needle tip emits a second light having a second wavelength. In some embodiments the needle tip is configured to absorb the first light, and in response to absorbing the first light, emit the second light. According to certain embodiments, the light detector comprises a filter configured to prevent the first light from being detected by the light detector. The first light may comprise ultraviolet light and the second light may comprise visible light. In some embodiments, the needle tip comprises fluorescent material configured to uniformly radiate the emitted light. The fluorescent material may be a liquid, a solid or a gaseous, and in some embodiments, the fluorescent material comprises a combination of at least two of a liquid, a solid, and a gaseous material.

In yet another aspect of the present disclosure, an injection training system is provided. The injection training system comprises a testing tool having a needle and a needle tip. The needle tip comprises a fluorescent material. The injection training system also includes an injection apparatus having an interior. The injection apparatus is configured to receive a simulated injection by the testing tool wherein the needle tip penetrates the injection apparatus. The injection training system also includes a light emitter positioned in the interior of the injection apparatus and configured to emit light in a general direction of the simulated injection. A light detector is also included. The light detector is positioned in the interior of the injection apparatus and configured to detect light emitted from the needle tip of the testing tool. In accordance with some embodiments, the needle tip comprises a solid fluorescent material. The light emitter may be configured to emit a first light having a first wavelength, and the needle tip may be configured to absorb the first light, and in response to absorbing the first light, emit a second light having a second wavelength. In some embodiments, the light detector includes a filter configured to block the first light from being detected by the light detector. In some embodiments, the light emitter emits ultraviolet light and the needle tip emits visible light. In certain embodiments the light emitter includes a light reflector configured to reflect the emitted light in the general direction of the simulated injection.

For purposes of summarizing the disclosure, certain aspects, advantages, and novel features have been described herein. Of course, it is to be understood that not necessarily all such aspects, advantages, or features will be embodied in any particular embodiment.

BRIEF DESCRIPTION OF THE DRAWINGS

The following drawings and the associated descriptions are provided to illustrate embodiments of the present disclosure and do not limit the scope of the claims.

DETAILED DESCRIPTION

Figures 1A, 1B:
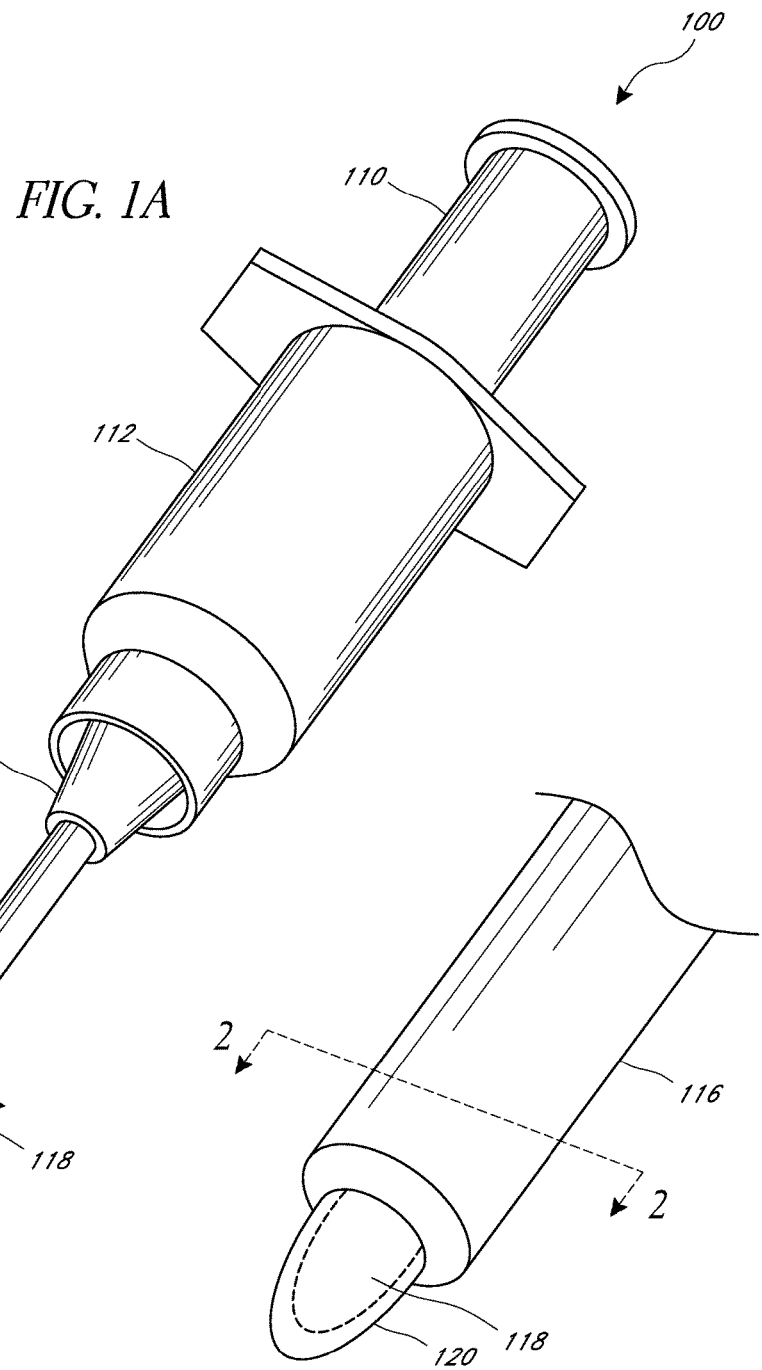
FIG. 1A is a perspective schematic view of a needle tip emitting omnidirectional injection light according to an embodiment of the present disclosure.
FIG. 1B is a magnified perspective schematic view of the needle tip of FIG. 1A.

Embodiments will now be described with reference to the accompanying figures. The following description is merely illustrative in nature and is in no way intended to limit the disclosure, its application, or its uses. For purposes of clarity, the same reference numbers will be used in the drawings to identify similar elements. The terminology used in the description presented herein is not intended to be interpreted in any limited or restrictive manner, simply because it is being used in conjunction with a detailed description of certain specific embodiments of the disclosure. Furthermore, embodiments of the disclosure may include several novel features, no single one of which is solely responsible for its desirable attributes or which is essential to practicing the present disclosure. It should be understood that steps within a method may be executed in different order without altering the principles of the present disclosure.

According to injection training systems disclosed herein, an injection apparatus (for example, an artificial face) is penetrated by an injection testing tool, such as for example, a needle mounted to a syringe to simulate a patient injection. The position of the needle tip in the injection apparatus reveals useful information regarding the skill level of the trainee. One method of tracking the needle tip position uses a sensor (such as, for example, a camera, a light detector, and the like) positioned in a clear interior of the injection apparatus. The sensor detects, through the clear interior of the injection apparatus, light emitted from the needle tip as the needle tip penetrates the injection apparatus during the simulated injection.

One embodiment of needle tip location technology utilizes light emitted from a light source, such as a light-emitting diode or a laser, through a needle tip, by means of an optical fiber positioned within the needle lumen. The emitted light is detectable by one or more sensors placed distal to the needle tip, such as sensors positioned within the interior of the injection apparatus. However, the light emitted from the exposed end of the optical fiber (radiating outwardly from the needle tip) travels substantially along the axis of the optical fiber. This axial light bias restricts the detectability of the emitted light to a limited angular range away from the axis of the optical fiber.

An important requirement of the training systems discussed herein is the ability to detect the needle tip as it travels along a path close to tangent with the external surface of the injection apparatus. Such a needle path is typical in many injection training scenarios, such as, for example, training to inject dermal filler material.

The present application discloses systems, methods, and apparatuses for providing omnidirectional light emission from the tip of the needle for use with injection training systems. The omnidirectional light emission improves the angular range of detection of the emitted light. The approach uses principles of fluorescence and/or diffusion to emit light in a substantially omnidirectional pattern from the needle tip in order to improve the detectability of the emitted light.

Figure 2:
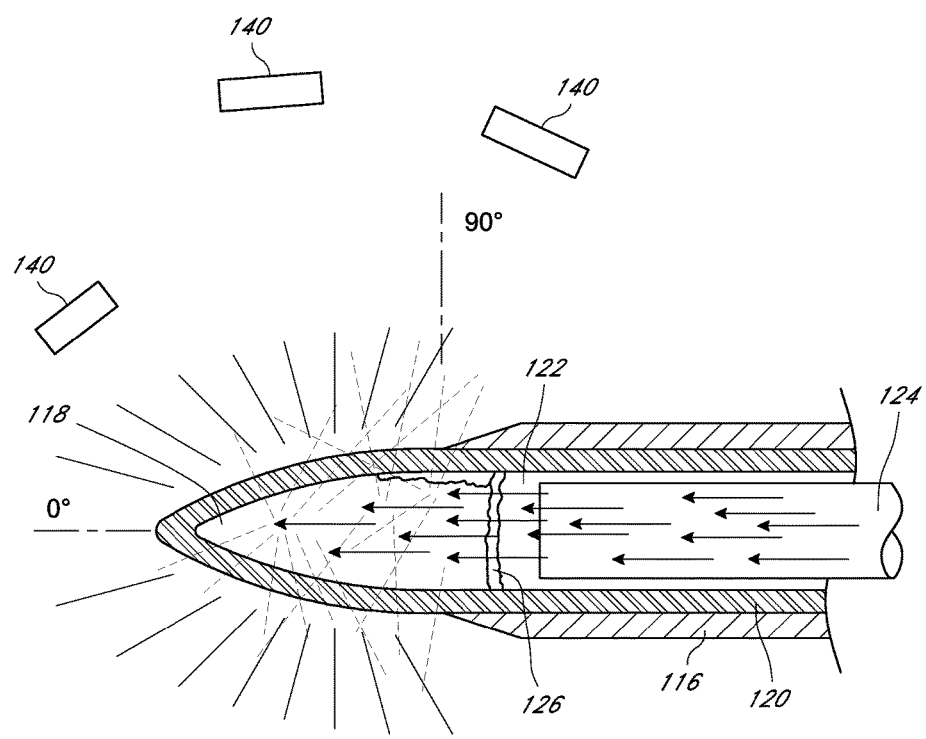
FIG. 2 is a sectional schematic view, cut along line 2-2, of an embodiment of the needle tip of FIG. 1B.

FIGS. 1A, 1B, and 2 illustrate a testing tool 100 in accordance with an embodiment of the present disclosure. The testing tool 100 contains a battery-powered light source (not shown) that emits light through the needle portion 116 of the testing tool 100. The light source may be configured to emit any type of light, including without limitation, one or more of visible light, non-visible light, ultraviolet light, polarized light, infrared light, and fluorescent light. The light source is used to aid in obtaining visual indications detectable by a light detector, such as a camera. The resulting light detected by the light detector can be used to determine many critical parameters associated with the injection such as, for example, the location of the injection, the pressure exerted by the user, the angle of the injection, the depth of the injection, and the like. This information can be detected by a light detector, for example by a camera, and communicated to a processing system and/or a user interface device or a display device for testing evaluation, display, and/or certification purposes.

The testing tool 100 includes a plunger 110, a barrel 112, a needle assembly 114, a needle, 116, and a needle tip 118. The testing tool 100 may be activated by pressing a switch (not shown) which activates a light source, such as a light-emitting diode (LED) or laser diode, to emit a source of light. The emitted light (which may also be referred to herein as the "driving light") then travels through an optical fiber 124 positioned within a central lumen 122 of the needle 116. The optical fiber 124 entrains the driving light from the light source and directs the driving light in the longitudinal axis of the needle 116. The driving light travels through the optical fiber 124 and is delivered as a focused driving light to a distal portion of the needle tip 118. Between the optical fiber 124 and the needle tip 118 is a light-transmissible barrier 126 which forms a sealed transparent enclosure 120 at the needle tip 118. The sealed transparent enclosure is filled and/or coated with a fluorescent material. The optic fiber 124 positioned in the needle's central lumen 122 delivers the driving light at a wavelength that stimulates a fluorescing process in the fluorescent material located in the sealed transparent enclosure 120. Fluorescence is a process by which a driving light having a first wavelength is absorbed by a fluorescent material, and in response to the absorption, the fluorescent material emits a second light (referred to herein as a "fluorescent light") at a second wavelength that is typically at a lower energy level than the first, absorbed light.

The fluorescent light is then emitted from the needle tip 118, which is surrounded by the transparent enclosure 120 having a closed point at a distal end of the needle tip 118. In one embodiment, the transparent enclosure 120 is a glass structure. One skilled in the art will appreciate that the transparent enclosure 120, including the light-transmissible barrier 126, may be made of many materials capable of containing the fluorescent material and permitting the fluorescent light to radiate through it. Advantageously, a property of fluorescent light is that it radiates substantially uniformly in all directions (also referred to herein as "omnidirectional") and is therefore detectable over a much broader angular range than that of the driving light emitted by means of an optical fiber 124 alone. Thus, the fluorescent light emitted by the fluorescent material can be detected by sensors 140 lateral to the testing tool's 100 (syringe's) axis.

Figure 3:
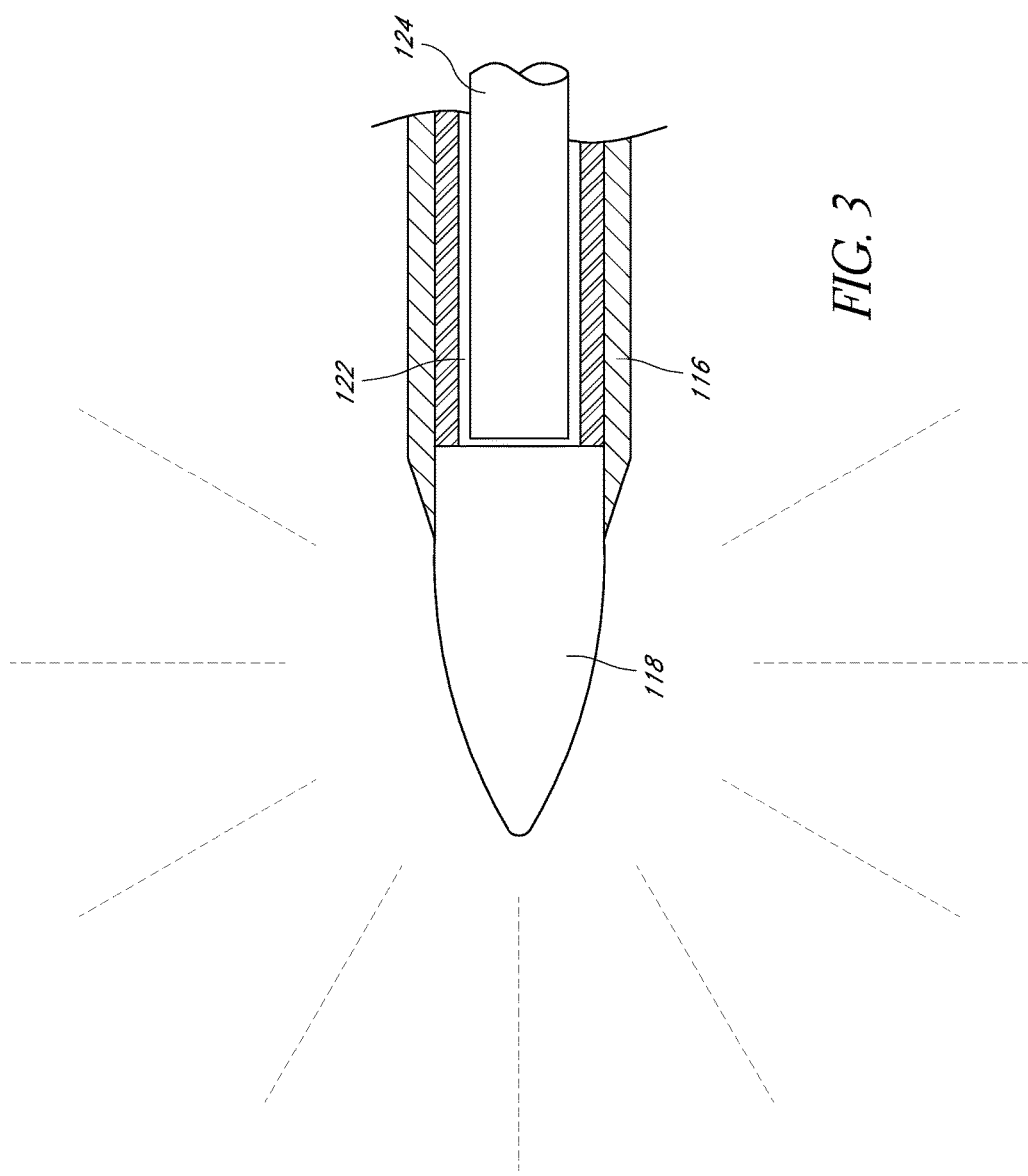
FIG. 3 is a sectional schematic view, cut along line 2-2, of an embodiment of needle tip of FIG. 1B in which the needle tip is made of solid fluorescing material.

FIG. 3 is a sectional schematic view, cut along line 2-2, of an embodiment of needle tip 118 of FIG. 1B in which the needle tip is made of solid fluorescing material. In this embodiment, the optical fiber 124 abuts to the needle tip 118 made of the solid fluorescent material. The solid tip may be made of ruby, treated glass, or other fluorescing materials. In use, the needle tip 118 absorbs the high-energy driving light from the optical fiber 124 and emits a lower-energy fluorescent light that radiates substantially uniformly from the needle tip 118. Advantageously, this embodiment is simple to manufacture because it has fewer components than the embodiments described above with respect to FIG. 2. In particular, the transparent enclosure 120 can be challenging and/or costly to manufacture, fill with fluorescent material, seal, and test as compared to the solid-tip embodiment. The solid needle tip 118 embodiment disclosed in FIG. 3 also provides an improved durability, as the solid fluorescent material may be more robust than a hollow transparent enclosure 120. The solid needle tip 118 may resist damage from both normal use and accidental impact. The solid-tip embodiment also provides improved needle tip 118 sharpness. The solid-tip fluorescent material may be precision ground to a point, while a hollow tip transparent enclosure 120 has comparatively thin walls and may frequently break when ground to a sharp point. Additionally, the solid-tip embodiment eliminates the risk of leaks of fluorescing liquid or gaseous materials that may be contained in the embodiments using a transparent enclosure 120.

The fluorescent material used in the present embodiments may be liquid, solid, gaseous, or a combination such materials. Illustratively, by way of non-limiting example, fluorescent materials that may be used in the disclosed embodiments include ruby, ninhydrin, and fluorescein. A skilled artisan will appreciate that there are numerous fluorescent materials that may be used to implement the disclosed embodiments. For example, the International Mineralogist Association lists 989 luminescent minerals and varieties of such minerals along with their properties which may be found at http://www.fluomin.org/uk/list.php?liste=1. Similarly, a database of fluorescent dyes along with their properties and applications can be accessed at http://www.fluorophores.tugraz.at/.

Advantageously, in certain embodiments, the improved detection range resulting from use of fluorescent light emitting from the needle tip 118 can support use of this technology in living tissue. Illustratively, the frequency of light from the fluorescing material can be tuned so as to pass through living tissue and allow detection from sensors that are positioned outside of the body. This can provide a source of information that can be used to perform improved needle placement during actual injection procedures as well as simulated procedures during training sessions.

Figure 4:
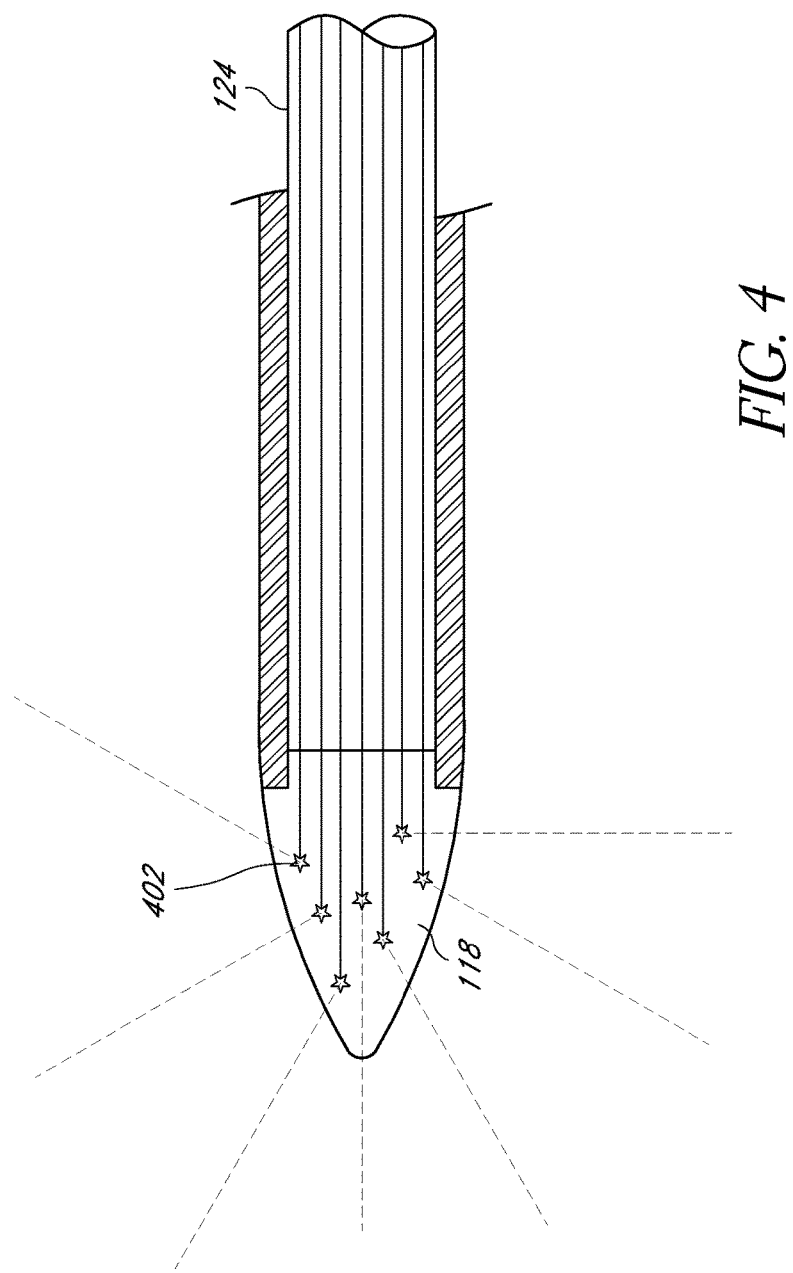
FIG. 4 is a schematic sectional view of an embodiment of a needle tip that diffuses light emitted from the testing tool.

FIG. 4 is a schematic sectional view of an embodiment of a needle tip 118 that diffuses light emitted from the testing tool 100. Light diffusion is a process by which photons travel though a material without being absorbed; instead, the photons undergo a series of repeated scattering events which change the direction of the photons' paths. Thus, light-diffusing materials cause the light to radiate in a more omnidirectional manner. As described above, the optical fiber 124 is positioned within the central lumen 122 of the needle 116. The optical fiber 124 entrains the driving light from the light source and directs the driving light in the longitudinal axis of the needle 116. The light travels through the optical fiber 124 and is delivered as a focused driving light to a distal portion of the needle tip 118. The optical fiber 124 is configured to abut the distal end of the needle tip 118. The distal end of the needle tip 118 may be constructed of a light-diffusing material. One such light-diffusing material is glass having a diffusing agent 402 added. The diffusing agent 402 may be particles of white titanium dioxide, reflective metal powder, or other such agents. In some embodiments, the needle tip 118 may be coated with a light-diffusing material. Provision of light-diffusing material at the needle tip 118 enables the conversion of the narrow and intense straight driving light path exiting the optical fiber 124 to one that is substantially omnidirectional, at reduced intensity. The result is that the needle tip 118 is observable at high angles off of the needle axis.

In certain embodiments, the needle tip 118 includes both fluorescent material and light-diffusing material. For example, the transparent enclosure 120 may be filled with a fluorescent material and have a light-diffusing coating on an interior surface, an exterior surface, or both an interior and exterior surface of the transparent enclosure 120. In an embodiment, the transparent enclosure 120 may be made of glass having a light-diffusing agent added to the glass.

In some embodiments, the optical fiber 124 extends beyond the distal end of the needle to form the needle tip 118, having a point. The needle tip 118 formed by the optical fiber 124 may have a light-diffusing coating, or it may contain a light-diffusing material. In other embodiments, the needle tip 118 formed by the optical fiber 124 may be coated with a fluorescent material.

Figure 5:
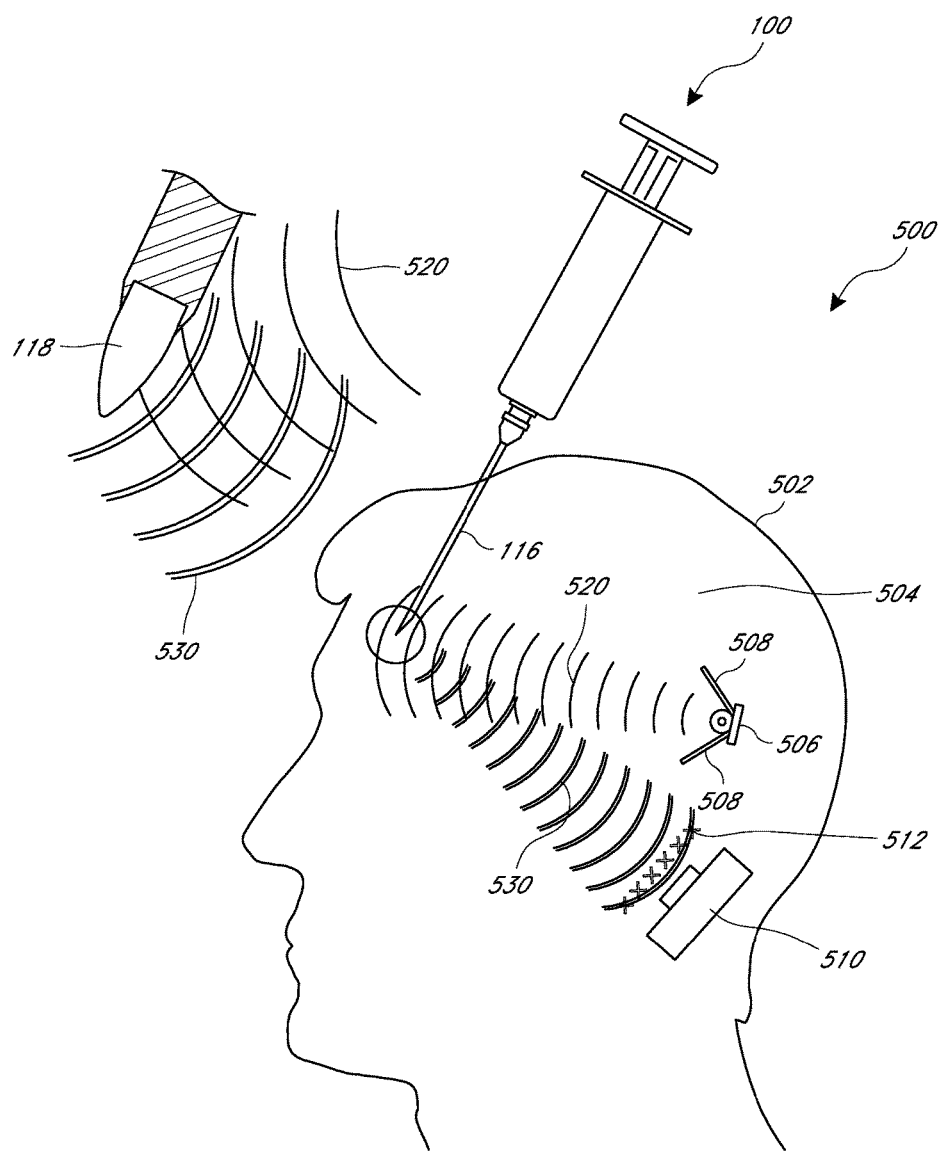
FIG. 5 is a sectional view of a surface fluorescing tip with an external source for driving light.

FIG. 5 is a sectional view of a surface fluorescing tip with an external source for driving light. FIG. 5 illustrates an injection training system 500 according to an embodiment of the present disclosure. The system 500 includes an injection apparatus 502 having a clear interior space 504 and configured to receive a simulated injection by a testing tool 100. The injection apparatus 502 is a synthetic anatomical structure that can be used for any type of injection training involved with administering diagnostic and therapeutic chemical substances. Illustratively, by way of non-limiting example, injection training can be provided for epidural techniques and for intra-cardiac injections. In one embodiment, as illustrated in FIG. 5, the injection apparatus 502 can anatomically model the face, neck, and head of a human. Although not shown in the accompanying drawings, the injection apparatus 502 can model other injection sites including the chest, arms, mouth, back, buttocks, etc. The injection apparatus 502 may also represent any body part of a human or animal, including internal organs. In some embodiments, the injection apparatus 502 may include a simulated skull and layers of muscle and skin. The injection apparatus 502 can be positioned on a base to facilitate use on flat surfaces, such as a table or desk.

Positioned within the interior 504 of the injection apparatus 502 is a light source 506 having one or more light reflectors 508. As illustrated in FIG. 5, the light source 506 is positioned within the interior 504 of the injection apparatus 502 so as to emit a driving light 520 generally in a direction of the simulated injection. Accordingly, the light source 506 and reflectors 508 are positioned toward a back portion of the head of the injection apparatus 502 and configured to emit the driving light 520 toward a face portion of the injection apparatus 502 where a simulated injection is performed.

A light detector 510 is also positioned within the interior 504 of the injection apparatus 502. The light detector 510 is positioned toward the back portion of the head of the injection apparatus 502 near the light source 506 and configured to detect fluorescent light 530 emitted from the tip 118 of testing tool 100 used to perform the simulated injection. In some embodiments, the light detector 510 includes a filter 512 configured to block one or more wavelengths of light from being detected by the light detector 510. For example, the filter 512 may be configured to block the driving light 520 emitted from the light source 506 so as to ensure that the light detector only detects the fluorescent light 530 emitted from the needle tip 118.

As described above, the needle tip 118 of the testing tool 100 includes fluorescent material. During a simulated injection, the light source 506 emits a driving light 520 that is delivered by, for example, a high-energy light emitter. In some embodiments, the light source 506 emits ultraviolet light 520 as the driving light. Advantageously, the fluorescent needle tip 118, which has penetrated into the interior 504 of the injection apparatus 502, absorbs the emitted driving ultraviolet light 520, and in response to the absorption, emits fluorescent light 530 having a wavelength in the visible spectrum. Since the fluorescent needle tip 118 radiates fluorescent light 530 at a different frequency (and corresponding wavelength) than the driving light 520 provided by the light source 506, the filter 512 can block the driving light 520 and pass only the fluorescent light 530 radiated by the fluorescent needle tip 118. This embodiment provides several benefits including eliminating the optical fiber 124 light path in the testing tool 100, offloading the power required for driving a light source 506 from the testing tool 100, extending battery life of the testing tool 100, and reducing the complexity of the testing tool 100.

An injection training system has been disclosed in detail in connection with various embodiments. These embodiments are disclosed by way of examples only and are not to limit the scope of the claims that follow. One of ordinary skill in the art will appreciate from the disclosure herein any variations and modifications.

Terminology/Additional Embodiments

The term "injection" as used herein includes it usual and customary meaning of an injection, but is also to be interpreted broad enough to encompass, for example, the insertion of a catheter device or the use of simple needles, such as would be used in an acupuncture therapy. The techniques involved, particularly a camera embedded in a model of a living subject and a tool with a light emitter can be applied to any therapeutic procedure. For example, the tool can be a catheter and the procedure can be a minimally invasive procedure requiring the catheter to be located in a particular location.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Depending on the embodiment, certain acts, events, or functions of any of the methods described herein can be performed in a different sequence, can be added, merged, or left out altogether (for example, not all described acts or events are necessary for the practice of the method). Moreover, in certain embodiments, acts or events can be performed concurrently, for example, through multi-threaded processing, interrupt processing, or multiple processors or processor cores, rather than sequentially.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the disclosures described herein can be embodied within a form that does not provide all of the features and benefits set forth herein, as some features can be used or practiced separately from others. The scope of certain disclosures disclosed herein is indicated by the appended claims rather than by the foregoing description. All changes which come within the meaning and range of equivalency of the claims are to be embraced within their scope.

What is claimed is:

1. A testing tool comprising:
a needle having a central lumen, a distal end, a proximal end, and a tip at the distal end of the needle, the tip comprising a fluorescent material;
a barrel cooperating with the proximal end of the needle;
a light source, positioned in the barrel, the light source configured to emit a first light having a first wavelength; and
an optical fiber located inside the central lumen of the needle, the optical fiber configured to receive the emitted first light from the light source and to transmit the emitted first light through the needle from the proximal end to the distal end so that the first light is emitted to the tip;
wherein the fluorescent material of the tip, upon receiving the first light, absorbs at least a portion of the first light and in response to absorbing the at least a portion of the first light emits a second light having a second wavelength from the tip.

2. The testing tool of claim 1, wherein the first light is one or more of visible light, non-visible light, ultraviolet light, polarized light, infrared light, and fluorescent light.

3. The testing tool of claim 1, wherein the tip comprises a transparent enclosure, the transparent enclosure filled with the fluorescent material.

4. The testing tool of claim 3, wherein the transparent enclosure comprises a light-diffusing coating.

5. The testing tool of claim 3, wherein the transparent enclosure comprises glass having a light-diffusing agent mixed into the glass.

6. The testing tool of claim 1, wherein the tip comprises a solid fluorescent material having a point.

7. The testing tool of claim 1, wherein the tip comprises a light-diffusing material.

8. A testing tool comprising:
a needle having a central lumen, a distal end, a proximal end, and a tip at the distal end of the needle, the tip comprising a light-diffusing material configured to radiate light in a substantially omnidirectional pattern;
a barrel cooperating with the proximal end of the needle;
a light source, positioned in the barrel, the light source configured to emit light; and
an optical fiber located inside the central lumen of the needle, the optical fiber configured to receive the emitted light from the light source and to transmit the emitted light through the needle from the proximal end to the distal end so that the light is emitted to the light-diffusing material of the tip.

9. The testing tool of claim 8, wherein the tip comprises a transparent enclosure filled with the light-diffusing material, the transparent enclosure having a point.

10. The testing tool of claim 9, wherein the transparent enclosure comprises glass having a light-diffusing agent mixed into the glass, the transparent enclosure filled with a fluorescent material.

11. The testing tool of claim 10, wherein the light emitter emits a first light having a first wavelength, and wherein the fluorescent material in the transparent enclosure is configured to absorb the first light, and in response to absorbing the first light, emit a second light having a second wavelength.

12. The testing tool of claim 8, wherein the tip comprises a solid light-diffusing material.

13. The testing tool of claim 8, wherein the tip comprises glass having a light-diffusing agent mixed into the glass.

14. A system for training clinicians to provide injections, the system comprising:
the testing tool of claim 1;
an injection apparatus having an internal portion, the injection apparatus configured to receive a simulated injection by the testing tool;
a light emitter, positioned in the internal portion of the injection apparatus, the light emitter configured to illuminate the tip with a first light having a first wavelength in response to the injection apparatus receiving the simulated injection by the testing tool; and
a light detector, positioned in the internal portion of the injection apparatus, the light detector configured to detect a second light having a second wavelength emitted from the illuminated needle tip.

15. The system of claim 14, wherein the tip comprises a transparent enclosure, the transparent enclosure filled with the fluorescent material.

16. The system of claim 15, wherein the transparent enclosure comprises glass having a light-diffusing agent mixed into the glass.

17. The system of claim 14, wherein the tip comprises a solid fluorescent material having a point.

18. The system of claim 14, wherein the tip is configured to absorb the first light, and in response to absorbing the first light, emit the second light.

19. The system of claim 14, wherein the light detector comprises a filter configured to prevent the first light from being detected by the light detector.

20. The system of claim 14, wherein the first light comprises ultraviolet light and the second light comprises visible light.

* * * * *

UNITED STATES PATENT AND TRADEMARK OFFICE
CERTIFICATE OF CORRECTION

PATENT NO.        : 10,235,904 B2
APPLICATION NO.   : 14/952809
DATED             : March 19, 2019
INVENTOR(S)       : Gabrielle A. Rios Page 1 of 1

It is certified that error appears in the above-identified patent and that said Letters Patent is hereby corrected as shown below:

In the Claims

Column 10, Line 67, In Claim 14, change "needle tip." to --tip.--.

Signed and Sealed this
Twenty-seventh Day of August, 2019

Andrei Iancu
*Director of the United States Patent and Trademark Office*